(12) United States Patent
Haufe et al.

(10) Patent No.: US 10,727,529 B2
(45) Date of Patent: Jul. 28, 2020

(54) LITHIUM ION BATTERIES

(71) Applicant: Wacker Chemie AG, Munich (DE)

(72) Inventors: Stefan Haufe, Neubiberg (DE); Daniel Braeunling, Munich (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/761,291

(22) PCT Filed: Aug. 2, 2016

(86) PCT No.: PCT/EP2016/068405
§ 371 (c)(1),
(2) Date: Mar. 19, 2018

(87) PCT Pub. No.: WO2018/024317
PCT Pub. Date: Feb. 8, 2018

(65) Prior Publication Data
US 2018/0269524 A1     Sep. 20, 2018

(51) Int. Cl.
| | |
|---|---|
| *H01M 10/0567* | (2010.01) |
| *H01M 10/0525* | (2010.01) |
| *H01M 4/38* | (2006.01) |
| *H01M 4/134* | (2010.01) |
| *H01M 4/1395* | (2010.01) |
| *H01M 10/0568* | (2010.01) |
| *H01M 4/02* | (2006.01) |

(52) U.S. Cl.
CPC ....... *H01M 10/0525* (2013.01); *H01M 4/134* (2013.01); *H01M 4/1395* (2013.01); *H01M 4/386* (2013.01); *H01M 10/0567* (2013.01); *H01M 10/0568* (2013.01); *H01M 2004/027* (2013.01); *H01M 2300/0017* (2013.01)

(58) Field of Classification Search
CPC ......... H01M 10/0525; H01M 10/0568; H01M 4/134; H01M 4/386; H01M 4/1395; H01M 10/0567; H01M 2300/0017; H01M 2004/027
See application file for complete search history.

(56) References Cited

U.S. PATENT DOCUMENTS

| | | | |
|---|---|---|---|
| 5,085,954 A | 2/1992 | Kita et al. | |
| 6,235,427 B1 | 5/2001 | Idota et al. | |
| 6,383,686 B1 | 5/2002 | Umeno et al. | |
| 6,413,672 B1 | 7/2002 | Suzuki et al. | |
| 7,476,469 B2 | 1/2009 | Ota et al. | |
| 8,551,661 B2 | 10/2013 | Amine et al. | |
| 2003/0049529 A1 | 3/2003 | Cho et al. | |
| 2003/0157407 A1 | 8/2003 | Kosuzu et al. | |
| 2003/0235762 A1 | 12/2003 | Fukui et al. | |
| 2004/0062991 A1 | 4/2004 | Fukui et al. | |
| 2005/0214646 A1 | 9/2005 | Kubota | |
| 2006/0003226 A1 | 1/2006 | Sawa et al. | |
| 2007/0281216 A1 | 12/2007 | Petrat et al. | |
| 2008/0038635 A1 | 2/2008 | Sheem et al. | |
| 2009/0305129 A1 | 12/2009 | Fukui et al. | |
| 2011/0045357 A1 | 2/2011 | Saito et al. | |
| 2014/0356735 A1* | 12/2014 | Pena Hueso | H01G 11/60 429/339 |
| 2016/0126538 A1 | 5/2016 | Hanelt et al. | |

FOREIGN PATENT DOCUMENTS

| | | |
|---|---|---|
| DE | 69027143 T2 | 1/1997 |
| EP | 1313158 A2 | 5/2003 |
| EP | 1730800 B1 | 5/2008 |
| EP | 1291941 B1 | 3/2014 |
| JP | 2000173596 A | 6/2000 |
| JP | 2000215887 A | 8/2000 |
| JP | 2004127535 A | 4/2004 |
| JP | 2005190977 A | 7/2005 |
| JP | 2005317309 A | 11/2005 |
| JP | 2007080836 A | 3/2007 |
| JP | 2008123814 A | 5/2008 |
| JP | 4911835 B2 | 4/2012 |
| JP | 2016520647 A | 7/2016 |
| KR | 20150130910 A | 11/2015 |
| WO | 2014202529 A1 | 12/2014 |

OTHER PUBLICATIONS

Ka et al. JP 2003-007342 A, machine translation (Year: 2003).*
M. Gauthier, Journal of Power Sources, 256, 2014, pp. 32-36.
Dahn et al., Journal of The Electrochemical Society, 162 (3) A437-A447 (2015).

\* cited by examiner

*Primary Examiner* — Wojciech Haske
(74) *Attorney, Agent, or Firm* — Brooks Kushman P.C.

(57) ABSTRACT

Lithium ion batteries containing fine, non-aggregated silicon particles have high initial voltage and exhibit good charge retention over large numbers of charge/discharge cycles when used with an electrolyte containing one or more amines, under conditions that silicon contained in the anode is only partially lithiated such that the ratio of Li:Si is less than or equal to 2.2:1.

23 Claims, 4 Drawing Sheets

FIG. 8

LITHIUM ION BATTERIES

CROSS REFERENCE TO RELATED APPLICATIONS

This application is the U.S. National Phase of PCT Appln. No. PCT/EP2016/068405 filed Aug. 2, 2016, the disclosure of which is incorporated in its entirety by reference herein.

BACKGROUND OF THE INVENTION

1. Field of the Invention

The invention relates to lithium ion batteries with silicon-containing anode materials.

2. Description of the Related Art

Rechargeable lithium ion batteries are nowadays the most practically useful electrochemical energy storage means with maximum gravimetric energy densities of, for example, up to 250 Wh/kg. They are used particularly in the field of portable electronics, for tools, and also for electrically driven modes of transport, for example motorcycles or automobiles. Especially for use in automobiles, however, it is necessary to further distinctly increase the energy density of the batteries in order to achieve higher electrical ranges of the motor vehicles.

Cyclic/aliphatic carbonates have been described in many cases as electrolyte stock solutions for lithium ion batteries, for example vinylene carbonate (VC) as specified in U.S. Pat. No. 7,476,469. Electrolyte additives for NMC442// graphite full cells recommended by Gu-Yeon Kim and J. R. Dahn, Journal of The Electrochemical Society, 162 (3) A437-A447 (2015) include nitriles such as succinonitrile (SN), adiponitrile (AN) or pimelonitrile (PN). DE 69027143 teaches tributylamine as an electrolyte additive. U.S. Pat. No. 8,551,661 describes an additive combination composed of $Li(C_2O_4)BF_2$ and amines, such as trialkylamines, arylamines or heterocyclic amines.

Graphitic carbon is a material in widespread use for the negative electrode ("anode") for lithium ion batteries. A drawback, however, is its relatively low electrochemical capacity of theoretically at most 372 mAh per gram of graphite, corresponding only to about one tenth of the electrochemical capacity theoretically achievable with lithium metal. To solve this problem, silicon has been recommended as an alternative anode active material. Silicon forms binary electrochemically active alloys with lithium, which can have a very high lithium content. The maximum lithium content known is found at $Li_{4.4}Si$, which corresponds to a very high theoretical specific capacity in the region of 4200 mAh per gram of silicon.

Disadvantageously, the intercalation and deintercalation of lithium into silicon is associated with a very great change in volume which can reach 300%. This expansion in volume leads to very significant mechanical stress on the crystallites, which ultimately leads to their breakup. This process in the active material and in the electrode structure, referred to as electrochemical grinding, leads to loss of electrical contacting and hence to the destruction of the electrode with loss of capacity. The decrease in the capacity over the course of multiple charge and discharge cycles is referred to as fading or continuous loss of capacity and is generally irreversible. For example, mixtures of micrometer-scale silicon and carbon give rise to electrodes having very high initial capacities of up to more than 2000 mAh per gram of electrode material, but these suffer marked fading.

To reduce the mechanical stress and hence to prevent electrochemical grinding, the use of nanoscale or nanostructured silicon particles for the anode material of lithium ion cells has been recommended in many cases, as described, for example, in WO 2014/202529 or EP 1730800. The nanoscale silicon particles of EP 1730800 are aggregated into aggregates.

M. Gauthier discusses, in the Journal of Power Sources, 256, 2014, pages 32 to 36, anode materials comprising silicon particles characterized by very broad multimodal size distributions and considerable coarse fractions. The half-cells described do not yet reach the coulombic efficiency required in practice. US 2003235762 also describes silicon particles having considerable coarse proportions without giving any details in relation to the process for producing the silicon particles. Thus, the grain form and sphericity of the silicon particles or nonaggregated silicon particles are not implicitly disclosed. The active material disclosed by the US 2009305129 document contains silicon particles having crystallite sizes of <100 nm and particle sizes of 7 to 25 μm, which have been produced via gas phase processes.

US 2005/0214646 describes batteries wherein the anode material in the charged state has a lithium/silicon ratio of not more than 4.0. Molar Li/Si ratios of 3.5 and greater are described in specific terms. JP 4911835 uses Li/Si ratios for the anode material of charged lithium ion batteries in the range from 2.3 to 4.0.

Lithium ion batteries known to date still have excessively high initial and/or continuous losses of capacity. One reason for this is the change in volume of the silicon particles in the charging and discharging of lithium ion batteries and the associated mechanical wear on the anode. Moreover, the surface of the silicon anode material reacts with constituents of the electrolyte to continuously form passivating protective layers (solid electrolyte interfaces; SEI), which leads to immobilization of lithium and a continuous rise in the resistance on the anode side. As a result in the change in volume of the silicon, these passivating protective layers are only partly stable, and so a certain amount of lithium is immobilized in each charge/discharge cycle. Since the amount of mobile lithium, corresponding to the usable capacity, in the full cell is limited, it is rapidly used up and the capacity of the cell is degraded after too few cycles. The decline in the reversible capacity of lithium ion batteries during the advanced cycles is also referred to as fading.

Against this background, it was an object of the present invention to provide lithium ion batteries having anodes comprising silicon particles, which have high initial reversible capacity and, in the subsequent cycles, stable electrochemical characteristics with a minimum decline in reversible capacity (fading).

SUMMARY OF THE INVENTION

The invention provides lithium ion batteries comprising a cathode, an anode comprising silicon particles, a separator and an electrolyte, characterized in that the electrolyte comprises one or more amines and the material of the anode (anode material) in the fully charged lithium ion battery is only partly lithiated.

The present invention further provides methods of operating lithium ion batteries comprising a cathode, an anode comprising silicon particles, a separator and an electrolyte, characterized in that the electrolyte comprises one or more amines and the material of the anode (anode material) is only partly lithiated in the fully charged lithium ion battery.

DETAILED DESCRIPTION OF THE PREFERRED EMBODIMENTS

It is thus essential to the invention that the anode material, especially the silicon particles, is only partly lithiated in the fully charged lithium ion battery. "Fully charged" refers to the state of the battery in which the anode material of the battery has its highest loading of lithium. Partial lithiation of the anode material means that the maximum lithium uptake capacity of the silicon particles in the anode material is not exhausted. The maximum lithium uptake capacity of the silicon particles corresponds generally to the formula $Li_{4.4}Si$ and is thus 4.4 lithium atoms per silicon atom. This corresponds to a maximum specific capacity of 4200 mAh per gram of silicon.

The ratio of the lithium atoms to the silicon atoms in the anode of a lithium ion battery (Li/Si ratio) can be adjusted, for example, via the flow of electrical charge. The degree of lithiation of the anode material or of the silicon particles present in the anode material is proportional to the electrical charge that has flowed. In this variant, in the charging of the lithium ion battery, the capacity of the anode material for lithium is not fully exhausted. This results in partial lithiation of the anode.

In an alternative, preferred variant, the Li/Si ratio of a lithium ion battery is adjusted via cell balancing. In this case, the lithium ion batteries are designed such that the lithium uptake capacity of the anode is preferably greater than the lithium release capacity of the cathode. The effect of this is that, in the fully charged battery, the lithium uptake capacity of the anode is not fully exhausted, meaning that the anode material is only partly lithiated.

In the case of the partial lithiation of the invention, the Li/Si ratio in the anode material in the fully charged state of the lithium ion battery is preferably ≤2.2, more preferably ≤1.98 and most preferably ≤1.76. The Li/Si ratio in the anode material in the fully charged state of the lithium ion battery is preferably ≥0.22, more preferably ≥0.44 and most preferably ≥0.66.

The capacity of the silicon in the anode material of the lithium ion battery is preferably utilized to an extent of ≤50%, more preferably to an extent of ≤45% and most preferably to an extent of 40%, based on a capacity of 4200 mAh per gram of silicon.

The degree of lithiation of silicon or the exploitation of the capacity of silicon for lithium (Si capacity utilization α) can be determined, for example, using the following formula:

$$\alpha = \frac{\beta}{\gamma \cdot FG \cdot \omega_{Si}}$$

β: delithiation capacity of the Si-containing anode at the respective charge circuit voltage of the lithium ion battery;

γ: maximum capacity of silicon for lithium in the case of a stoichiometry of $Li_{22}Si_5$ (corresponding to 4200 mAh/g);

FG: basis weight of the anode coating;

$\omega_{Si}$: proportion by weight of Si in the anode coating.

Determination of the Delithiation Capacity β:

firstly, the lithium ion battery is converted to the electrically charged state by charging it by the cc (constant current) method with a constant current of 5 mA/g (corresponding to C/25) until attainment of the voltage limit of 4.2 V. In the course of this, the anode is lithiated. The lithium ion battery thus charged is opened, the anode is removed and it is used to assemble a button half-cell (CR2032 type, Hohsen Corp.) with a lithium counterelectrode (Rockwood Lithium, thickness 0.5 mm, Dm=15 mm). A glass fiber filter paper (Whatman, GD Type D) impregnated with 120 μl of electrolyte can serve as separator (Dm=16 mm). The electrolyte used is a 1.0 molar solution of lithium hexafluorophosphate in a 3:7 (v/v) mixture of fluoroethylene carbonate and ethyl methyl carbonate, to which 2.0% by weight of vinylene carbonate has been added. The cell is generally built in a glovebox (<1 ppm of $H_2O$ and $O_2$ in the glovebox atmosphere). The water content of the dry mass of all feedstocks is preferably below 20 ppm.

The delithiation capacity β of the Si-containing anode coating is determined by charging the button half-cell thus produced (working electrode=positive electrode=Si anode; counterelectrode=negative electrode=lithium) at C/25 until attainment of the voltage limit of 1.5 V. The electrochemical measurements on the full- and half-cell are conducted at 20° C. The abovementioned constant current is based on the weight of the coating of the positive electrode.

Determination of the Proportion by Weight of Si $\omega_{Si}$:

Electrolyte is first washed out of a sample of the fully delithiated anode coating (without Cu foil) with tetrahydrofuran. This is followed by acidic digestion of a sample. For this purpose, 75 mg of the anode coating are added to a microwave digestion vessel (100 ml TFM liner from Anton Paar), and 5 ml of $HNO_3$ (65%, p.a.), 0.25 ml of HCl (37%, p.a.) and 1 ml of HF (40%, superpure) are added. The microwave digestion vessel is closed, introduced into a microwave apparatus (Multiwave 3000 Anton Paar) and treated at 950 W for 45 min. The digestive is transferred completely into 50 ml tubes and made up to 50 ml with water. 0.50 ml thereof are withdrawn, 2.50 ml of 4% boric acid are added and the mixture is made back up to 50 ml (dilution: factor of 100). The proportion by weight of Si $\omega_{Si}$ is determined by means of ICP-OES (inductively coupled plasma) emission spectrometry (instrument: Optima 7300 DV, from Perkin Elmer; sample introduction system: Meinhard atomizer with cyclone spray chamber; calibration range: 0.1 to 20.0 mg/l Si; Certipur standard Si stock solution from Merck with 1000 mg/l Si (certified)).

The amines in the electrolyte may, for example, be primary, secondary or especially tertiary amines. The amines may be aromatic or preferably aliphatic. The amines may bear one or more amine groups. Polyamines are also suitable. Amines preferably bear 1 to 5 amine groups and more preferably 1 to 3 amine groups. Most preferred are amines having one amine group (monoamines).

Preferred monoamines satisfy the general formula (I)

$R^1$, $R^2$, $R^3$ are H or monovalent hydrocarbyl radicals which have 1-30 carbon atoms and may be substituted by substituents selected from F—, Cl— and —OR$^4$, and in which nonadjacent —CH$_2$— units may be replaced by units selected from —C(=O)— and —O—, and

$R^4$ is an alkyl radical having 1-10 carbon atoms.

Hydrocarbyl radicals $R^1$, $R^2$, $R^3$ may be linear, cyclic, branched, aromatic, saturated or unsaturated. Preference is given to alkylaryl radicals, arylalkyl radicals and phenyl radicals. Hydrocarbyl radicals $R^1$, $R^2$, $R^3$ preferably have 1 to 20 carbon atoms, more preferably 1 to 6 carbon atoms.

When two or three of the $R^1$, $R^2$, $R^3$ radicals are joined to one another, they may form a mono- or bicyclic hydrocarbon ring.

Preference is given to tertiary amines, especially those in which, in the general formula (I), $R^1$, $R^2$, $R^3$ are monovalent, preferably unsubstituted hydrocarbyl radicals having 1 to 30 carbon atoms, more preferably 2 to 10 carbon atoms.

Preferred polyamines satisfy the general formula (II)

$R^5$, $R^6$, $R^7$ are H or hydrocarbyl radicals which have 1 to 18 carbon atoms and may be substituted by substituents selected from F—, Cl— and —OH, and in which nonadjacent —CH$_2$— units may be replaced by units selected from —C(=O)— and —O—, a, b are integer values from 1 to 6 and c is the value of 0 or an integer value from 1 to 40.

a, b are preferably 2 or 3. c is preferably an integer from 1 to 6. Preferably, a and b are the same.

Examples of preferred polyamines of the general formula (II) are: diethylenetriamine (H$_2$N—CH$_2$CH$_2$—NH—CH$_2$CH$_2$—NH$_2$), triethylenetetramine (H$_2$N—CH$_2$CH$_2$—(NH—CH$_2$CH$_2$—)$_2$—NH$_2$), tetraethylenepentamine (H$_2$N—CH$_2$CH$_2$—(NH—CH$_2$CH$_2$—)$_3$—NH$_2$), pentaethylenehexamine (H$_2$N—CH$_2$CH$_2$—(NH—CH$_2$CH$_2$—)$_4$—NH$_2$), hexaethyleneheptamine (H$_2$N—CH$_2$CH$_2$—(NH—CH$_2$CH$_2$—)$_5$—NH$_2$). Mixtures of such amines are commercially available, for example, under the AMIX1000® trade name (BASF SE).

Further examples of preferred amines are tributylamine, tripentylamine, trihexylamine, triisooctylamine, octylamine, nonylamine, decylamine, undecylamine, dodecylamine (laurylamine), triisooctylamine, tridecylamine, tridecylamine (isomer mixture), tetradecylamine (myristylamine), pentadecylamine, hexadecylamine (cetylamine), heptadecylamine, octadecylamine (stearylamine), 4-hexylaniline, 4-heptylaniline, 4-octylaniline, 2,6-diisopropylaniline, 4-ethoxyaniline, N-methylaniline, N-ethylaniline, N-propylaniline, N-butylaniline, N-pentylaniline, N-hexylaniline, N-octylaniline, N-cyclohexylaniline, dicyclohexylamine, p-toluidine, indoline, 2-phenylethylamine, 1-phenylethylamine, N-methyldecylamine, benzylamine, N,N-dimethylbenzylamine, 1-methylimidazole, 2-ethylhexylamine, dibutylamine, dihexylamine, di(2-ethylhexylamine), 3,3'-dimethyl-4,4'-diaminodicyclohexylmethane, 4,4'-diaminodicyclohexylmethane, ditridecylamine (isomer mixture), isophoronediamine, N,N,N',N'-tetramethyl-1,6-hexanediamine, N,N-dimethylcyclohexylamine, octamethylenediamine, 2,6-xylidine, 4,7,10-trioxatridecane-1,13-diamine, 4,9-dioxadodecane-1,12-diamine, di(2-methoxyethyl)amine, bis(2-dimethylaminoethyl) ether, Polyetheramine D230® (BASF SE), 2-(diisopropylamino)ethylamine, pentamethyldiethylenetriamine, N-(3-aminopropyl)imidazole, 1,2-dimethylimidazole, 2,2'-dimorpholinodiethyl ether, dimethylaminoethoxyethanol, bis(2-dimethylaminoethyl) ether, Lupragen® N600—S-triazine (BASF AG), 1,8-diazabicyclo[5.4.0]undec-7-ene (DBU), 3-(2-aminoethylamino)propylamine, 3-(cyclohexylamino)propylamine, dipropylenetriamine, N4-amine (N,N'-bis(3-aminopropyl)-ethylenediamine), AMIX M (BASF AG) (=high-boiling morpholine derivatives), 1-(2-hydroxyethyl)piperazine, 1-vinylimidazole, 1-hexylimidazole, 1-octylimidazole, and 1-(2-ethylhexyl) imidazole.

Particularly preferred amines are tertiary alkylamines such as tributylamine, tripentylamine, trihexylamine, triisooctylamine, N,N-dimethylbenzylamine, N,N-dimethylcyclohexylamine, bis(2-dimethylaminoethyl) ether, 2-(diisopropylamino)ethylamine, pentamethyldiethylenetriamine, 2,2'-dimorpholinodiethyl ether, dimethylaminoethoxyethanol, and bis(2-dimethylaminoethyl) ether. Most preferred are tributylamine, tripentylamine, trihexylamine and triisooctylamine.

Preference is given to amines having a boiling point of 120° C. at 1013 hPa, especially 150° C. at 1013 hPa.

Preferably, the electrolyte contains 0.1 to 10 parts by weight, more preferably 0.5 to 8 parts by weight and most preferably 1 to 5 parts by weight of amine.

In a preferred embodiment of the present invention, the electrolyte additionally comprises one or more nitriles. With electrolytes of this kind, the object of the invention can be achieved even better.

Generally, nitriles of mono- or polycarboxylic acids are suitable. The nitriles may bear aromatic or preferably aliphatic, saturated hydrocarbyl radicals. The nitriles may bear two or more terminal nitrile groups, and preferably bear one terminal nitrile group. The nitriles preferably bear 1 to 5 nitrile groups and more preferably 1 to 3 nitrile groups. Most preferred are nitriles having one nitrile group. The nitriles contain preferably 2 to 20 carbon atoms, especially 4 to 12 carbon atoms.

Preference is given to nitriles of monocarboxylic acids, such as those of acetic acid, propionic acid, butyric acid, valeric acid and caproic acid, and of the fatty acids having up to 18 carbon atoms. Particular preference is given to valeronitrile (VN) or derivatives thereof. Preference is also given to the dinitriles of malonic acid, succinic acid, glutaric acid, adipic acid, pimelic acid and suberic acid.

Particular preference is given to silylated nitriles, especially of aliphatic saturated monocarboxylic acids having up to 18 carbon atoms. Silylated nitriles generally bear one or more silyl groups, preferably 1 to 5 silyl groups, more preferably one silyl group. The silyl groups are typically bonded to aliphatic or aromatic carbon atoms in the nitriles.

The silyl groups preferably bear one or more alkyl radicals, for example having 1 to 10 carbon atoms, especially 1 to 5 carbon atoms, such as methyl or ethyl radicals. More preferably, the silyl groups bear 1 to 3, even more preferably 1 to 2 and most preferably 2 alkyl radicals.

The silyl groups may optionally be substituted, for example by one or more halogens, especially by fluorine.

The silyl groups are preferably substituted by 1 to 3 halogens, more preferably by 1 to 2 halogens and most preferably by one halogen.

Examples of silylated nitriles are 3-(fluorodimethylsilyl)-butanenitrile (FSN), 3-(fluorodimethylsilyl)propanenitrile, 3-(fluorodimethylsilyl)pentanenitrile, 3-(fluoromethylsilyl)-butanenitrile and 3-(difluoromethylsilyl)butanenitrile. Preference is given to 3-(fluorodimethylsilyl)butanenitrile (FSN).

Nitriles preferably have a boiling point of preferably 120° C. at 1013 hPa, more preferably 150° C. at 1013 hPa.

The electrolyte preferably contains 0.5 to 20 parts by weight, more preferably 1 to 15 parts by weight and most preferably 2 to 10 parts by weight of nitrile.

In addition, the electrolyte may additionally comprise one or more aprotic solvents, one or more lithium-containing conductive salts, optionally film formers and optionally one or more additives.

The aprotic solvent is preferably selected from the group comprising organic carbonates such as dimethyl carbonate, diethyl carbonate, ethyl methyl carbonate, ethylene carbonate, vinylene carbonate, propylene carbonate, and butylene carbonate; cyclic and linear esters such as methyl acetate, ethyl acetate butyl acetate, propyl propionate, ethyl butyrate, and ethyl isobutyrate; cyclic and linear ethers such as 2-methyltetra-hydrofuran, 1,2-diethoxymethane, THF, dioxane, 1,3-dioxolane, diisopropyl ether, and diethylene glycol dimethyl ether; ketones such as cyclopentanone, diisopropyl ketone, and methyl isobutyl ketone; lactones such as γ-butyrolactone;

sulfolanes; dimethyl sulfoxide; formamide; dimethylformamide; 3-methyl-1,3-oxazolidine-2-one, and mixtures of these solvents. Particular preference is given to the above-described organic carbonates.

The electrolyte preferably contains 100 parts by weight of aprotic solvent.

The lithium-containing conductive salt is preferably selected from the group comprising $LiPF_6$, $LiBF_4$, $LiClO_4$, $LiAsF_6$, $(LiB(C_2O_4)_2, LiBF_2(C_2O_4))$, $LiSO_3C_xF_{2x+1}$, $LiN(SO_2C_xF_{2x+1})_2$ and $LiC(SO_2CxF_{2x+1})_3$, where x assumes integral values from 0 to 8, and mixtures thereof.

The electrolyte preferably contains 1 to 50 parts by weight, more preferably 5 to 30 parts by weight and most preferably 10 to 20 parts by weight of lithium-containing conductive salt.

Examples of film formers are vinylene carbonate and fluoroethylene carbonate. With film formers, it is possible to achieve a significant improvement in the cycling stability of the anode of the invention comprising silicon particles. This is attributed mainly to the formation of a solid electrolyte interphase on the surface of active particles.

The electrolyte preferably contains 5 to 100 parts by weight, more preferably 10 to 70 parts by weight, yet more preferably 20 to 50 parts by weight, and most preferably 12 to 30 parts by weight of film former.

Examples of additives are organic isocyanates, for example for lowering the water content, HF scavengers, solubilizers for LiF, organic lithium salts and/or complex salts.

The anode material comprises silicon particles.

The volume-weighted particle size distribution of the silicon particles is preferably between the diameter percentiles $d_{10} \geq 0.2$ μm and $d_{90} \leq 20.0$ μm, more preferably between $d_{10} \geq 0.2$ μm and $d_{90} \leq 10.0$ μm and most preferably between $d_{10} \geq 0.2$ μm to $d_{90} \leq 5.0$ μm. The silicon particles have a volume-weighted particle size distribution having diameter percentiles $d_{10}$ of preferably $\leq 10$ μm, more preferably $\leq 5$ μm, even more preferably $\leq 3$ μm, and most preferably $\leq 1$ μm. The silicon particles have a volume-weighted particle size distribution having diameter percentiles $d_{90}$ of preferably $\geq 0.5$ μm. In one embodiment of the present invention, the aforementioned $d_{90}$ value is preferably $\geq 5$ μm.

The volume-weighted particle size distribution of the silicon particles has a breadth $d_{90}-d_{10}$ of preferably $\leq 15.0$ μm, more preferably $\leq 12.0$ μm, even more preferably $\leq 10.0$ μm, yet more preferably $\leq 8.0$ μm, and most preferably $\leq 4.0$ μm. The volume-weighted particle size distribution of the silicon particles has a breadth $d_{90}-d_{10}$ of preferably $\geq 0.6$ μm, more preferably $\geq 0.8$ μm and most preferably $\geq 1.0$ μm.

The volume-weighted particle size distribution of the silicon particles has diameter percentiles $d_{50}$ of preferably 0.5 to 10.0 μm, more preferably 0.6 to 7.0 μm, even more preferably 2.0 to 6.0 μm, and most preferably 0.7 to 3.0 μm.

Twice to five times, especially two to three times, the aforementioned $d_{50}$ values is preferably less than the layer thickness of the anode coating. The layer thickness of the anode coating is specified below. This provision is helpful in order to virtually rule out oversize grains.

The volume-weighted particle size distribution of the silicon particles is determinable by static laser scattering using the Mie model with a Horiba LA 950 instrument with ethanol as a dispersion medium for the silicon particles.

The volume-weighted particle size distribution of the silicon particles is preferably monomodal. The volume-weighted particle size distribution of the silicon particles is generally narrow, as can be seen from the $d_{10}$ or $d_{90}$ values and $d_{90}-d_{10}$ values.

The silicon particles are non-aggregated, preferably non-agglomerated and/or preferably non-nanostructured. "Aggregated" means that spherical or very substantially spherical primary particles, as initially formed, for example, in gas phase processes in the production of the silicon particles, aggregate to form aggregates later on in the reaction of the gas phase process. These aggregates can form agglomerates later on in the reaction. Agglomerates are a loose assembly of aggregates. Agglomerates can readily be split back up into the aggregates by kneading and dispersing methods that are typically used. Aggregates can be divided into primary particles only partly, if at all, by these methods. Aggregates and agglomerates, owing to the way in which they are formed, inevitably have quite different sphericities and grain shapes from the silicon particles of the invention. The presence of silicon particles in the form of aggregates or agglomerates can be visualized, for example, by means of conventional scanning electron microscopy (SEM). Static light scattering methods for determination of the particle size distributions or particle diameters of silicon particles, by contrast, cannot distinguish between aggregates and agglomerates.

Non-nanostructured silicon particles generally have characteristic BET surface areas. The BET surface areas of the silicon particles are preferably 0.01 to 30.0 $m^2/g$, more preferably 0.1 to 25.0 $m^2/g$, yet more preferably 0.2 to 20.0 $m^2/g$, and most preferably 0.2 to 18.0 $m^2/g$. The BET surface area is determined according to DIN 66131 (with nitrogen).

The silicon particles preferably have a sphericity of $0.3 \leq \psi \leq 0.9$, more preferably $0.5 \leq \psi \leq 0.85$ and most preferably $0.65 \leq \psi \leq 0.85$. Silicon particles having such sphericities are especially obtainable by production by means of grinding processes. The sphericity ψ is the ratio of the surface area of a ball of the same volume to the actual surface area of a body (definition of Wadell). Sphericities can be determined, for example, from conventional SEM images.

The silicon particles may consist of elemental silicon, a silicon oxide or a binary, ternary or multinary silicon/metal alloy (with, for example, Li, Na, K, Sn, Ca, Co, Ni, Cu, Cr, Ti, Al, Fe). Preference is given to using elemental silicon, especially since it has an advantageously high storage capacity for lithium ions.

Elemental silicon is understood to mean high-purity polysilicon with a low proportion of foreign atoms (for example B, P, As), silicon doped selectively with foreign atoms (for example B, P, As), but also silicon from metallurgical processing, which may include elemental contamination (for example Fe, Al, Ca, Cu, Zr, C).

If the silicon particles contain a silicon oxide, the stoichiometry of the oxide $SiO_x$ is preferably in the range of $0<x<1.3$. If the silicon particles contain a silicon oxide with higher stoichiometry, the layer thickness thereof at the surface is preferably less than 10 nm.

When the silicon particles are alloyed with an alkali metal M, the stoichiometry of the alloy $M_ySi$ is preferably in the range of $0<y<5$. The silicon particles may optionally have been prelithiated. If the silicon particles have been alloyed with lithium, the stoichiometry of the alloy $Li_zSi$ is preferably in the range of $0<z<2.2$.

Particular preference is given to silicon particles containing ≥80 mol % of silicon and/or ≤20 mol % of foreign atoms, most preferably ≤10 mol % of foreign atoms.

The surface of the silicon particles may optionally be covered by an oxide layer or by other inorganic and organic groups. Particularly preferred silicon particles bear Si—OH or Si—H groups or covalently attached organic groups, for example alcohols or alkenes, on their surface. It is possible via the organic groups, for example, to control the surface tension of the silicon particles and especially match it to the solvents or binders that may be used in the production of the anode coatings.

The silicon content in the anode material is preferably between 40% by weight and 95% by weight, more preferably between 50% by weight and 90% by weight and most preferably between 60% by weight and 80% by weight, based on the total weight of the anode material.

The silicon particles can be produced, for example, by grinding processes. Standard gas phase deposition, by contrast, is generally unsuitable for production of silicon particles configured in accordance with the invention.

By grinding processes, silicon particles having the properties of the invention are obtainable, for example having advantageous sphericities, such as the fracture surfaces that are advantageous in use, especially sharp-edged fracture surfaces, or, for example, silicon particles in the form of chips. The particle size distributions of the silicon particles and non-aggregated silicon particles that are essential to the invention are also obtainable very efficiently by grinding processes.

Silicon particles produced by gas phase processes, by contrast, are generally round or acicular in shape. The gas phase deposition typically results in aggregation of particles. In order to produce non-aggregated silicon particles by means of gas phase processes, the gas phase reactors would have to be operated with extremely low gas concentrations or extremely short reactor dwell times, but this frustrates the formation of silicon particles with the microscale particle size of the invention and leads to industrially unviable production times. If, by contrast, aggregated silicon particles are desired, gas phase processes are highly suitable for the production of microscale Si aggregates with primary particle size in the nanometer range.

Useful grinding processes include, for example, dry or wet grinding processes. In this case, preference is given to using planetary ball mills, jet mills such as counter-jet or impingement mills, or stirred ball mills.

Grinding in a jet mill is preferably effected with nitrogen or noble gases, preferably argon, as a grinding gas. The jet mills preferably have an integrated windsifter which may be in static or dynamic form, or they are operated in circulation with an external windsifter.

For the grinding for production of the silicon particles in suspension, it is possible to use one or more organic or inorganic liquids or liquid mixtures. Preferably, such liquids or liquid mixtures preferably have a viscosity at room temperature of below 100 mPas and more preferably below 10 mPas. Preferably, the liquids or liquid mixtures are inert or weakly reactive toward silicon. More preferably, the liquid is organic and contains less than 5% by weight of water, more preferably less than 1% by weight of water. Preferred organic liquids are hydrocarbons, esters, or especially alcohols. The alcohols preferably contain 1 to 7 and more preferably 2 to 5 carbon atoms. Examples of alcohols are methanol, ethanol, propanol and butanol. Preference is given to ethanol and 2-propanol. Hydrocarbons contain preferably 5 to 10 and more preferably 6 to 8 carbon atoms. Hydrocarbons may, for example, be aliphatic or aromatic. Examples of hydrocarbons are toluene and heptane. Esters are generally esters of carboxylic acids and alkyl alcohols, for example ethyl acetate.

In the production of the silicon particles by wet grinding in a suspension, preference is given to using grinding bodies having a mean diameter 10 to 1000 times greater than the $d_{90}$ of the distribution of the material to be ground. Particular preference is given to grinding bodies having a mean diameter 20 to 200 times greater than the $d_{90}$ of the starting distribution of the material to be ground.

The anode material is preferably based on a mixture comprising silicon particles, one or more binders, optionally graphite, optionally one or more further electrically conductive components, and optionally one or more additives.

By use of further electrically conductive components in the anode material, it is possible to reduce the transfer resistances within the electrode and between the electrode and output conductor, which improves the current durability of the lithium ion battery. Preferred further electrically conductive components are conductive black, carbon nanotubes or metallic particles, for example copper.

The anode material preferably contains 0% to 40% by weight, more preferably 0% to 30% by weight, and most preferably 0% to 20% by weight of one or more further electrically conductive components, based on the total weight of the anode material.

Preferred binders are polyacrylic acid or the alkali metal salts thereof, especially lithium or sodium salts, polyvinyl alcohols, cellulose or cellulose derivatives, polyvinylidene fluoride, polytetrafluoroethylene, polyolefins, polyimides, especially polyamide imides, or thermoplastic elastomers, especially ethylene-propylene-diene terpolymers. Particular preference is given to polyacrylic acid, polymethacrylic acid or cellulose derivatives, especially carboxymethylcellulose. Particular preference is also given to the alkali metal salts, especially lithium or sodium salts, of the aforementioned binders. Most preferred are the alkali metal salts, especially lithium or sodium salts, of polyacrylic acid or of polymethacrylic acid. It is possible to use all or preferably a proportion of the acid groups of a binder in the form of salts. The binders have a molar mass of preferably 100,000 to 1,000,000 g/mol. It is also possible to use mixtures of two or more binders.

The graphite used may generally be natural or synthetic graphite. The graphite particles preferably have a volume-weighted particle size distribution between the diameter percentiles $d_{10}>0.2$ μm and $d_{90}<200$ μm.

Examples of additives are pore formers, dispersants, leveling agents or dopants, for example elemental lithium.

Preferred formulations for the anode material of the lithium ion batteries contain preferably 5 to 95% by weight, especially 60% to 85% by weight, of silicon particles; 0% to 40% by weight, especially 0% to 20% by weight, of further electrically conductive components; 0% to 80% by weight, especially 5% to 30% by weight, of graphite; 0% to 25% by weight, especially 5% to 15% by weight, of binders; and optionally 0% to 80% by weight, especially 0.1% to 5% by weight, of additives; where the figures in % by weight are based on the total weight of the anode material and the proportions of all constituents of the anode material add up to 100% by weight.

In a preferred formulation for the anode material, the proportion of graphite particles and further electrically conductive components totals at least 10% by weight, based on the total weight of the anode material.

The constituents of the anode material can be processed to give an anode ink or paste, for example in a solvent such as water, hexane, toluene, tetrahydrofuran, N-methylpyrrolidone, N-ethylpyrrolidone, acetone, ethyl acetate, dimethyl sulfoxide, dimethylacetamide or ethanol, or in solvent mixtures, preferably using rotor-stator machines, high-energy mills, planetary kneaders, stirred ball mills, agitators or ultrasound appliances.

The anode ink or paste preferably has a pH of 2 to 7.5 (determined at 20° C., for example with the WTW pH 340i pH meter with SenTix RJD probe).

The anode ink or paste can, for example, be knife-coated onto a copper foil or another current collector. Other coating methods, for example spin-coating, roll-coating, dip-coating or slot die coating, painting or spraying, may likewise be used.

The layer thickness, i.e. the dry layer thickness of the anode coating, is preferably 2 μm to 500 μm, more preferably from 10 μm to 300 μm.

The anode material is generally dried to constant weight. The drying temperature is guided by the components used and the solvent used. It is preferably between 20° C. and 300° C., more preferably between 50° C. and 150° C.

Finally, the electrode coatings can be calendered in order to establish a defined porosity.

Preferred cathode materials used may, for example, be lithium cobalt oxide, lithium nickel oxide, lithium nickel cobalt oxide (doped or undoped), lithium manganese oxide (spinel), lithium nickel cobalt manganese oxides, lithium nickel manganese oxides, lithium iron phosphate, lithium cobalt phosphate, lithium manganese phosphate, lithium vanadium phosphate, or lithium vanadium oxides.

The separator is generally an electrically insulating membrane which is permeable to ions, as commonly used in battery manufacture. As is well known, the separator separates the first electrode from the second electrode and thus prevents electronically conductive connections between the electrodes (short-circuit).

A lithium ion battery generally comprises a first electrode as cathode, a second electrode as anode, a membrane arranged between the two electrodes as separator, two electrically conductive connections to the electrodes, a housing that accommodates the components mentioned, and an electrolyte containing lithium ions, with which the separator and the two electrodes are impregnated, wherein a portion of the second electrode contains the anode material of the invention. The lithium ion battery of the invention can be used in all standard forms, for example in wound, folded or stacked form.

All the substances and materials utilized for production of the lithium ion battery of the invention, as described above, are known. The production of the components of the battery of the invention and the assembly thereof to form the battery of the invention are effected by the methods known in the field of battery manufacture.

Surprisingly, the lithium ion batteries of the invention exhibit improved cycling characteristics. The lithium ion batteries have a small irreversible loss of capacity in the first charging cycle and stable electrochemical characteristics with only slight fading in the subsequent cycles. More particularly, the initial loss of lithium that results from the breakdown of electrolyte at the active material surface in the first lithiation with formation of a protective layer (=solid electrolyte interface, SEI) is reduced. With the procedure of the invention, it is thus possible to minimize the initial and continuous loss of capacity of lithium ion batteries. Overall, the lithium ion batteries of the invention have very good stability. This means that, even in the case of a multitude of cycles, there are barely any fatigue phenomena, for example as a result of mechanical breakdown of the anode material of the invention or SEI that lead to a loss of capacity.

Surprisingly, it is possible by the procedure of the invention to obtain lithium ion batteries which, as well as the aforementioned advantageous cycling characteristics, simultaneously also have a high volumetric energy density.

These effects are achieved via synergistic interaction of the partial lithiation of the invention and of the electrolyte of the invention. The preferred silicon particles can enhance these effects even further.

The examples which follow serve to further elucidate the invention:

Example 1

Production of Non-Aggregated Silicon Particles of Sub-micrometer size in the form of chips by grinding:

First of all, 500 g of pure silicon (particle size distribution: d10=8 μm, d50=15 μm and d90=25 μm; produced by grinding coarser particles with a fluidized bed jet mill) were suspended homogeneously in 2 kg of ethanol (99% purity) by stirring for 20 minutes. The grinding space of the Netzsch LabStar LS1 laboratory stirred ball mill with ZETA ceramic grinding system was filled with 490 ml of yttria-stabilized zirconia grinding beads (mean diameter: 0.3 mm) and closed. The suspension of silicon and ethanol was introduced into the cooled (15° C.) grinding vessel of the mill and pumped through the mill in circulation with a throughput of 40 kg/h. Grinding was effected at a mill speed of 3000 rpm for 55 min. After the grinding operation, ethanol was added to the suspension until its solids concentration was 21.8% by weight. Measurement of the particle distribution by static laser scattering employing the Mie model with a Horiba LA 950 in a highly dilute suspension in ethanol gave d10=0.26 μm, d50=0.79 μm and d90=2.30 μm, and a breadth (d90-d10) of 2.0 μm.

Example 2

Production of an Anode with the Silicon Particles from Example 1 and Sodium Carboxymethylcellulose as Binder:

11.0 g of the suspension of silicon in ethanol from example 1 (solids concentration: 21.8% by weight) were dispersed in 12.52 g of a 1.4% by weight solution of sodium carboxymethylcellulose (Daicel, Grade 1380) in water by means of a dissolver at a circumferential speed of 4.5 m/s for 5 min and of 17 m/s for 30 min with cooling at 20° C. After addition of 0.856 g of graphite (Imerys, KS6L C), the mixture was then stirred at a circumferential speed of 12 m/s for a further 30 min. After degassing, the dispersion was applied to a copper foil of thickness 0.030 mm (Schlenk Metallfolien, SE-Cu58) by means of a film applicator with gap width 0.20 mm (Erichsen, model 360). The anode coating thus produced was then dried at 80° C. and an air pressure of 1 bar for 60 min. The mean basis weight of the dry anode coating was 2.90 mg/cm$^2$.

Example 3 (Ex.3)

Lithium Ion Battery with the Anode from Example 2:

The electrochemical studies were conducted in a button cell (CR2032 type, Hohsen Corp.) in a 2-electrode arrangement. The electrode coating from example 2 was used as counterelectrode or negative electrode (Dm=15 mm), and a coating based on 1:1:1 lithium nickel manganese cobalt oxide with a content of 94.0% and a mean basis weight of 14.5 mg/cm$^2$ (sourced from Custom Cells) as working electrode or positive electrode (Dm=15 mm). A glass fiber filter paper (Whatman, GD type D) impregnated with 120 μl of electrolyte served as separator (Dm=16 mm). The electrolyte used consisted of a 1.0 molar solution of lithium hexafluorophosphate in a 3:7 (v/v) mixture of vinylene carbonate and diethyl carbonate, to which 10.0% by weight of fluorodimethylsilylbutanenitrile and 2.0% by weight of tributylamine had been added. The cell was built in a glovebox (<1 ppm H$_2$O, O$_2$); the water content in the dry mass of all components used was below 20 ppm.

The electrochemical testing was conducted at 20° C. The cell was charged by the cc/cv method (constant current/constant voltage) with a constant current of 5 mA/g (corresponding to C/25) in the first cycle and of 60 mA/g (corresponding to C/2) in the subsequent cycles and, on attainment of the voltage limit of 4.2 V, at constant voltage until the current went below 1.2 mA/g (corresponding to C/100) or 15 mA/g (corresponding to C/8). The cell was discharged by the cc method (constant current) at a constant current of 5 mA/g (corresponding to C/25) in the first cycle and of 60 mA/g (corresponding to C/2) in the subsequent cycles until attainment of the voltage limit of 3.0 V.

The specific current chosen was based on the weight of the coating of the positive electrode.

Owing to the formulation in examples 2 and 3, the lithium ion battery was operated by cell balancing with partial lithiation of the anode.

Figure 1:
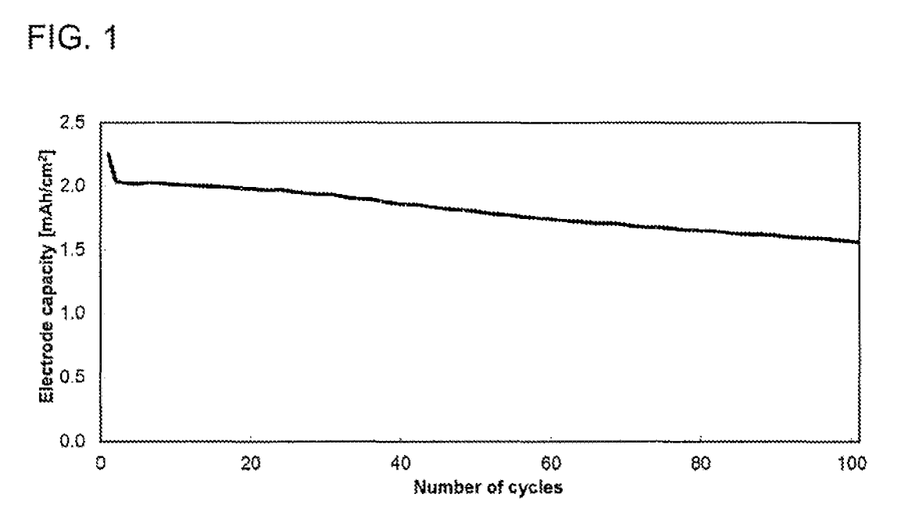
FIG. 1 shows the discharge capacity of a full cell from example 3 as a function of the number of cycles.

FIG. 1 shows the discharge capacity of a full cell from example 3 as a function of the number of cycles. The full cell in the second cycle has a reversible initial capacity of 2.04 mAh/cm$^2$ and, after 85 charge/discharge cycles, still has 80% of its original capacity.

Comparative Example 4 (CEx.4)

Lithium Ion Battery with the Anode from Example 2, but Non-Inventive Electrolyte:

The anode from example 2 was tested analogously to example 3. However, the electrolyte used consisted of a 1.0 molar solution of lithium hexafluorophosphate in a 3:7 (v/v) mixture of fluoroethylene carbonate and ethyl methyl carbonate, to which 2.0% by weight of vinylene carbonate had been added.

Figure 2:
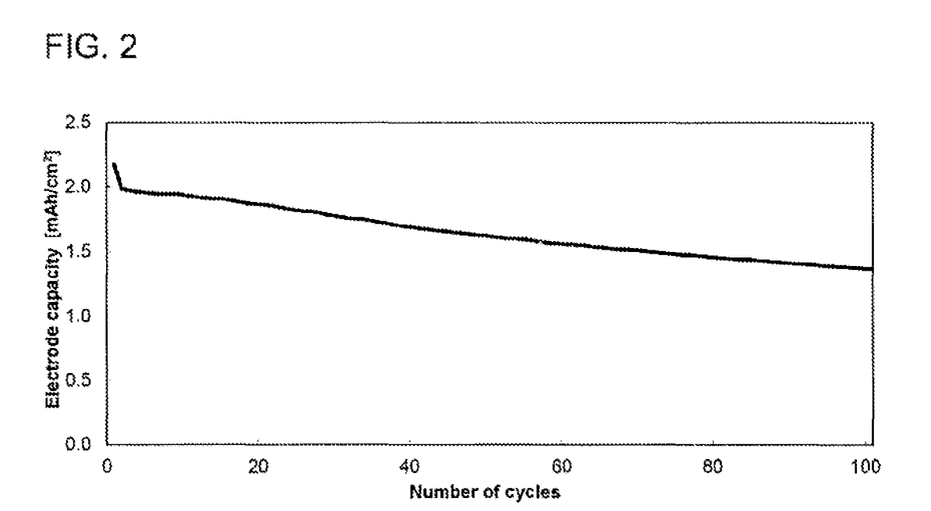
FIG. 2 shows the discharge capacity of a full cell from comparative example 4 as a function of the number of cycles.

FIG. 2 shows the discharge capacity of a full cell from comparative example 4 as a function of the number of cycles. The full cell in the second cycle has a reversible initial capacity of 1.99 mAh/cm$^2$ and, even after 60 charge/discharge cycles, has only 80% of its original capacity.

Example 5

Production of Nanoscale Non-Aggregated Silicon Particles in the Form of Chips by Grinding:

Analogous to example 1, but with a grinding time of 600 min. Nanoscale non-aggregated silicon particles were obtained in the form of chips. The solids content of the suspension was adjusted to 22.3% by weight by addition of ethanol.

The measurement of the particle distribution by static laser scattering employing the Mie model with a Horiba LA 950 in a highly dilute suspension in ethanol gave a size distribution with d10=0.09 μm, d50=0.18 μm and d90=0.32 μm.

Example 6

Production of an Anode with the Silicon Particles from Comparative Example 5 and Sodium Carboxymethylcellulose as Binder:

3.03 g of the suspension of silicon in ethanol from comparative example 4 (solids concentration: 22.3% by weight) and 0.41 g of conductive black (Imerys, Super P Li) were dispersed in 19.35 g of a 1.4% by weight solution of sodium carboxymethyl cellulose (Daicel, Grade 1380) in water by means of a dissolver at a circumferential speed of 4.5 m/s for 15 min and of 17 m/s for 45 min with cooling at 20° C. After addition of 2.04 g of graphite (Imerys, SFG6), the mixture was then stirred at a circumferential speed of 12 m/s for 30 min. After degassing, the dispersion was applied to a copper foil of thickness 0.030 mm (Schlenk Metallfolien, SE-Cu58) by means of a film applicator with gap width 0.20 mm (Erichsen, model 360). The anode coating thus produced was then dried at 80° C. and an air pressure of 1 bar for 60 min. The mean basis weight of the dry anode coating was 2.18 mg/cm$^2$.

Comparative Example 7 (CEx.7)

Lithium Ion Battery with the Anode from Comparative Example 6:

The anode from comparative example 6 with nanoscale silicon particles in the form of chips was tested as described in example 3.

Owing to the formulation in comparative example 6, the lithium ion battery was operated with maximum lithiation of the anode.

Figure 3:
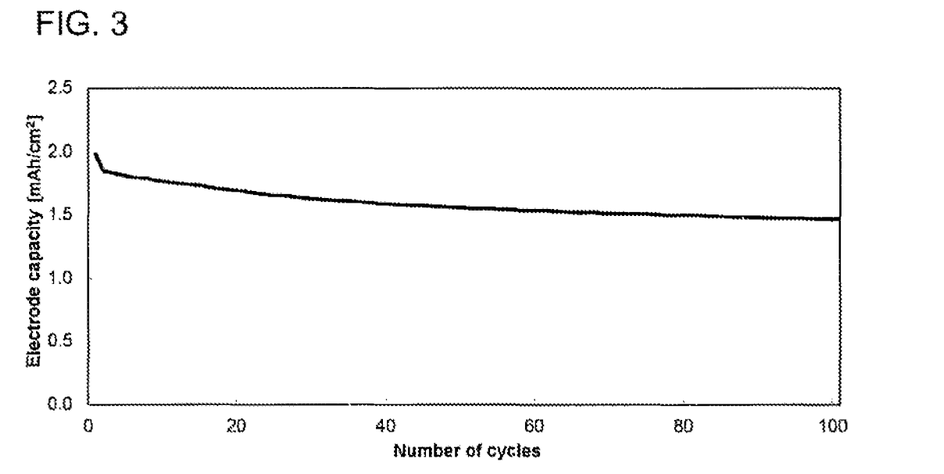
FIG. 3 shows a discharge capacity of a full cell from comparative example 7 as a function of the number of cycles.

FIG. 3 shows a discharge capacity of a full cell from comparative example 7 as a function of the number of cycles. The full cell in the second cycle has a reversible initial capacity of only 1.85 mAh/cm$^2$ and, after 88 charge/discharge cycles, still has 80% of its original capacity.

Example 8

Production of an Anode with the Silicon Particles from Example 1 and Lithium-Polyacrylic Acid as Binder:

12.5 g of a 14.4% by weight suspension of silicon in water, produced from a centrifugate of the ethanolic silicon suspension from example 1, were dispersed in 0.372 g of a 35% by weight solution of polyacrylic acid in water (sourced from Sigma-Aldrich, Mw 250 000 g/mol) and 0.056 g of lithium hydroxide monohydrate (sourced from Sigma-Aldrich) by means of a dissolver at a circumferential speed of 4.5 m/s for 5 min and of 17 m/s for 30 min with cooling at 20° C. After addition of 0.645 g of graphite (Imerys, KS6L C), the mixture was then stirred at a circumferential speed of 12 m/s for a further 30 min. After degassing, the dispersion was applied to a copper foil of thickness 0.030 mm (Schlenk Metallfolien, SE-Cu58) by means of a film applicator of gap width 0.12 mm (Erichsen, model 360). The anode coating thus produced was then dried at 80° C. and an air pressure of 1 bar for 60 min. The mean basis weight of the dry anode coating was 2.73 mg/cm$^2$.

Example 9 (Ex.9)

Lithium Ion Battery with the Anode from Example 8:

The anode from example 8 was tested as described in example 3.

Figure 4:
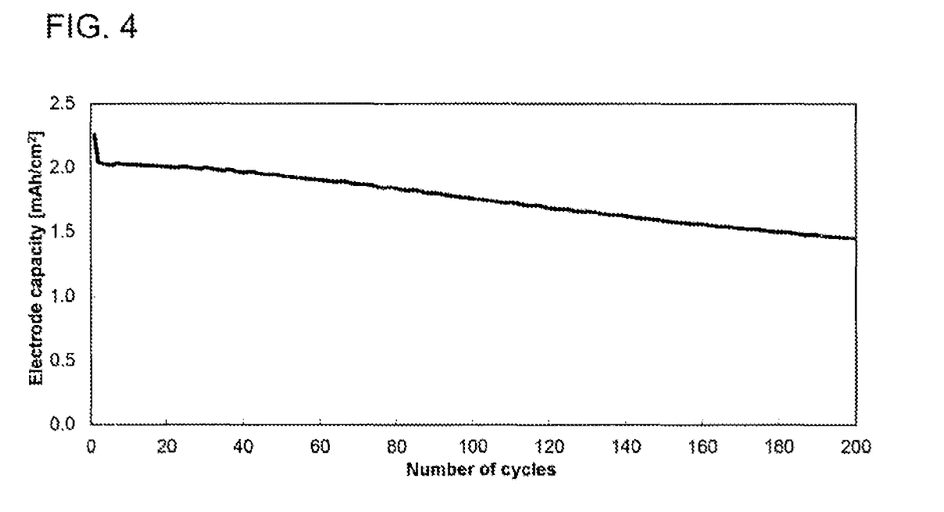
FIG. 4 shows the discharge capacity of a full cell from example 9 as a function of the number of cycles.

FIG. 4 shows the discharge capacity of a full cell from example 9 as a function of the number of cycles. The full cell in the second cycle has a reversible initial capacity of 2.04 mAh/cm$^2$ and, after 135 charge/discharge cycles, still has 80% of its original capacity.

Comparative Example 10

Lithium Ion Batteries with the Anode from Example 8, but Non-Inventive Electrolyte:

The anode from example 8 was tested analogously to example 3. However, the electrolyte used consisted of a 1.0 molar solution of lithium hexafluorophosphate in a 3:7 (v/v) mixture of fluoroethylene carbonate and ethyl methyl carbonate, to which 2.0% by weight of vinylene carbonate had been added.

Figure 5:
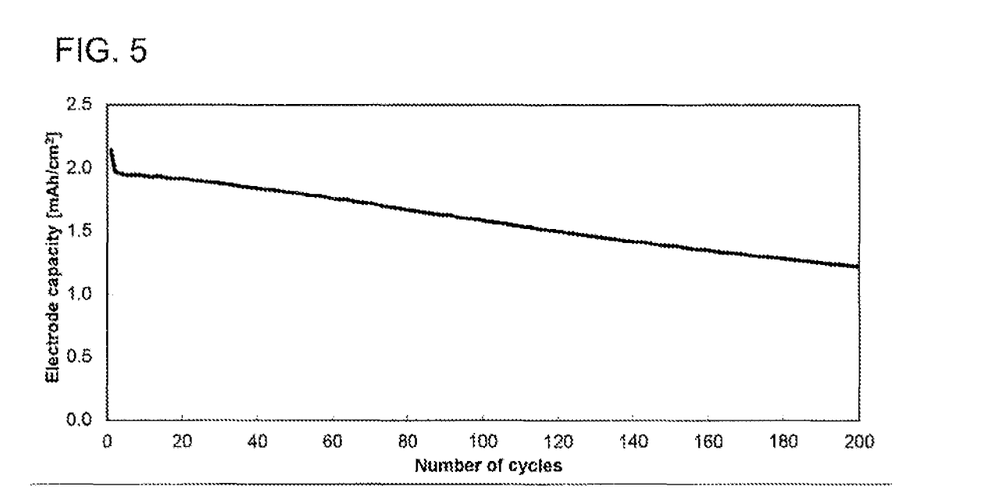
FIG. 5 shows the discharge capacity of a full cell from example 10 as a function of the number of cycles.

FIG. 5 shows the discharge capacity of a full cell from comparative example 10 as a function of the number of cycles. The full cell in the second cycle has a reversible discharge capacity of 1.97 mAh/cm$^2$ and, after 100 charge/discharge cycles, has only 80% of its original capacity.

Example 11

Lithium Ion Battery Analogous to Example 8, but with Different Electrolyte Composition:

The anode from example 8 was tested analogously to example 3. However, the electrolyte used consisted of a 1.0 molar solution of lithium hexafluorophosphate in a 3:7 (v/v) mixture of vinylene carbonate and diethyl carbonate, to which 2.0% by weight of tributylamine had been added.

Figure 6:
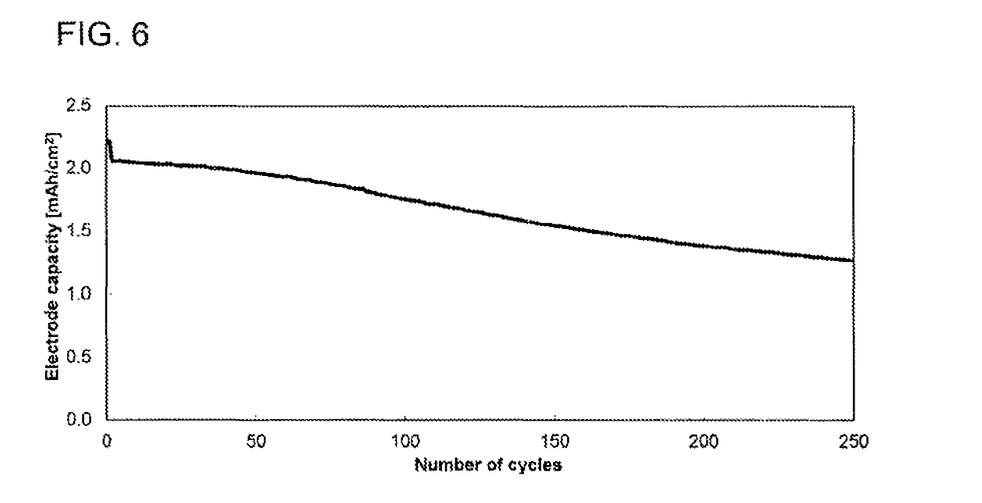
FIG. 6 shows the discharge capacity of a full cell from example 11 as a function of the number of cycles.

FIG. 6 shows the discharge capacity of a full cell from example 11 as a function of the number of cycles. The full cell in the second cycle has a reversible initial capacity of 2.03 mAh/cm$^2$ and, after 125 charge/discharge cycles, still has 80% of its original capacity.

Comparative Example 12 (CEx.12)

Lithium ion battery with the anode from example 8, except that the mean basis weight of the dry anode coating was 0.82 mg/cm$^2$. The anode was tested as described in example 3.

Owing to its formulation, the lithium ion battery in comparative example 12 was operated with maximum lithiation of the anode.

Figure 7:
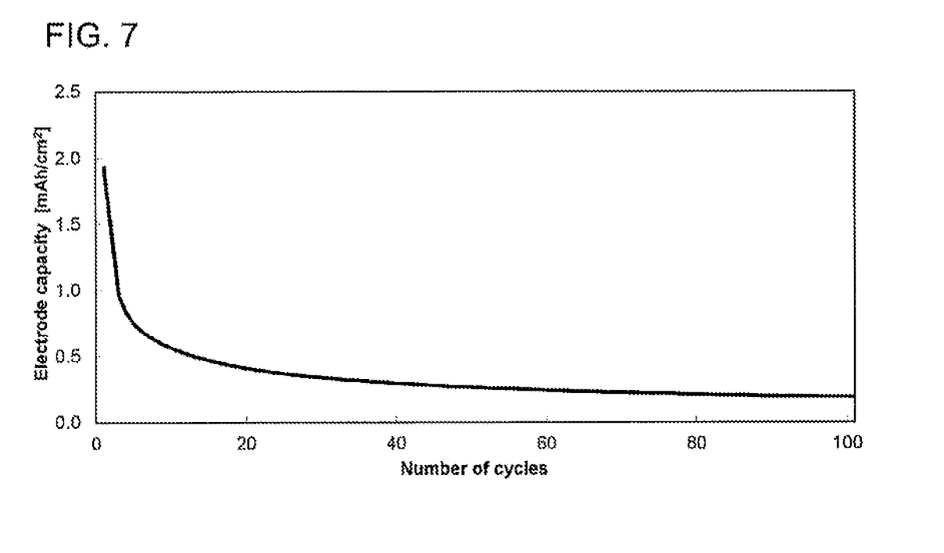
FIG. 7 shows the discharge capacity of a full cell from example 12 as a function of the number of cycles.

FIG. 7 shows the discharge capacity of a full cell from comparative example 12 as a function of the number of cycles. The full cell in the second cycle has only a reversible initial capacity of 1.45 mAh/cm$^2$ and, after just one charge/discharge cycle, has less than 80% of its original capacity.

Comparative Example 13 (CEx.13)

Lithium Ion Battery with the Anode from Example 2, but Non-Inventive Electrolyte:

The anode from example 2 was tested analogously to example 3. However, the electrolyte used consisted of a 1.0 molar solution of lithium hexafluorophosphate in a 3:7 (v/v) mixture of fluoroethylene carbonate and ethyl methyl carbonate. The electrolyte thus did not contain any film former (vinylene carbonate).

Figure 8:
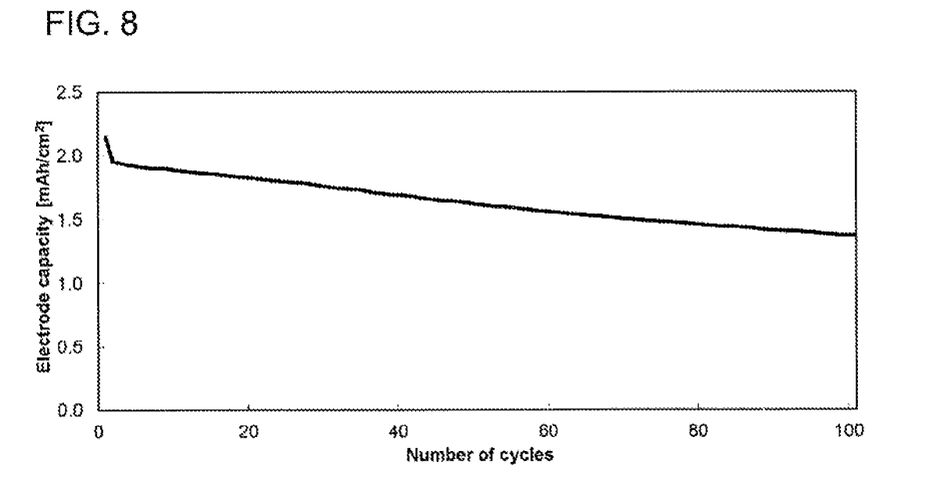
FIG. 8 shows the discharge capacity of a full cell from example 13 as a function of the number of cycles.

FIG. 8 shows the discharge capacity of a full cell from comparative example 13 as a function of the number of cycles. The full cell in the second cycle has a reversible initial capacity of 1.95 mAh/cm$^2$ and, after 59 charge/discharge cycles, has only 80% of its original capacity.

The table summarizes the testing results with the lithium ion batteries from examples 3, 9 and 11 and from comparative examples 4, 7, 10, 12 and 13.

The lithium ion batteries from examples 3, 9 and 11, by comparison with the lithium ion batteries from comparative examples 4, 7, 10, 12 and 13, surprisingly have a high initial capacity (after cycle 1) and more stable electrochemical characteristics in the subsequent cycles.

TABLE

Testing results with the lithium ion batteries from examples 3, 9 and 11 and from comparative examples 4, 7, 10, 12 and 13:

| (C) Ex. | $d_{50}$[a] [μm] | Anode binder[b] | Electrolyte | Lithiation | Discharge capacity after cycle 1 [mAh/cm$^2$] | Number of cycles with ≥80% retention of capacity |
|---|---|---|---|---|---|---|
| 3 | 0.79 | Na-CMC | 1[c] | partial | 2.04 | 85 |
| 13 (c) | 0.79 | Na-CMC | 4[f] | partial | 1.95 | 59 |
| 4 (c) | 0.79 | Na-CMC | 2[d] | partial | 1.99 | 60 |
| 7 (c) | 0.18 | Na-CMC | 1[c] | maximum | 1.85 | 88 |
| 9 | 0.79 | Li-PAA | 1[c] | partial | 2.04 | 135 |

TABLE-continued

Testing results with the lithium ion batteries from
examples 3, 9 and 11 and from comparative examples 4, 7, 10, 12 and 13:

| (C) Ex. | $d_{50}$[a] [μm] | Anode binder[b] | Electrolyte | Lithiation | Discharge capacity after cycle 1 [mAh/cm$^2$] | Number of cycles with ≥80% retention of capacity |
|---|---|---|---|---|---|---|
| 10 (c) | 0.79 | Li-PAA | 2[d] | partial | 1.97 | 100 |
| 11 | 0.79 | Li-PAA | 3[e] | partial | 2.03 | 124 |
| 12 (c) | 0.79 | Li-PAA | 1[c] | maximum | 1.45 | 1 |

[a] particle size distribution d50 of silicon;
[b] Na-CMC: sodium carboxymethylcellulose; Li-PAA: lithium polyacrylic acid;
[c] electrolyte 1: contains fluorodimethylsilylbutanenitrile and tributylamine;
[d] electrolyte 2: contains no amine and no nitrile, but does contain vinylene carbonate
[e] electrolyte 3: contains tributylamine, but no nitrile;
[f] electrolyte 4: contains no vinylene carbonate.

The invention claimed is:

1. A lithium ion battery comprising a cathode, an anode comprising silicon particles, a separator and an electrolyte, wherein:
the electrolyte comprises one or more amines and the anode material in the fully charged lithium ion battery is only partly lithiated,
wherein the silicon particle's volume-weighted particle size distribution has a diameter percentile $d_{50}$ of from 0.6 to 10 μm, the silicon particles have a surface with an oxide layer, or contains Si—OH groups, Si—H groups, or covalently bonded organic groups, wherein the organic groups are derived from an alcohol, alkene, or mixture thereof, and
with the proviso that the ratio of the lithium atoms to silicon atoms in the partly lithiated anode material of the fully charged battery is ≥0.22 and ≤1.98.

2. The lithium ion battery of claim 1, wherein the ratio of lithium atoms to silicon atoms in the partly lithiated anode material of the fully charged battery is ≥0.44 and ≤1.76.

3. The lithium ion battery of claim 2, wherein the capacity of silicon of the anode material in the lithium ion battery is utilized to an extent of ≤50%, based on a maximum capacity of 4200 mAh per gram of silicon.

4. The lithium ion battery of claim 2, wherein the electrolyte comprises one or more monoamines and/or one or more polyamines, where the monoamines are of the formula (I)

$$NR^1R^2R^3 \quad (I)$$

in which
$R^1$, $R^2$, $R^3$ are H or monovalent hydrocarbyl radicals which have 1 to 30 carbon atoms and may be substituted by one or more substituents selected from the group consisting of F—, Cl— and —OR$^4$, and in which nonadjacent —CH$_2$— units are optionally replaced by units —C(=O)— and —O—, and
$R^4$ is an alkyl radical having 1 to 10 carbon atoms; and polyamines are of the formula (II)

$$R^5{}_2N-(CR^6{}_2)_a-(NR^7-(CR^6{}_2)_b)_c-NR^5{}_2 \quad (II)$$

in which
$R^5$, $R^6$, $R^7$ are H or hydrocarbyl radicals which have 1 to 18 carbon atoms and are optionally
substituted by one or more substituents selected from the group consisting of F—, Cl— and —OH, and in which nonadjacent —CH$_2$— units are optionally replaced by units —C(=O)— and —O—,
a, b are integers from 1 to 6, and
c has the value of 0 or is an integer from 1 to 40.

5. A lithium ion battery of claim 2, wherein the electrolyte comprises one or more amines selected from the group consisting of diethylenetriamine, triethylenetetramine, tetraethylenepentamine, pentaethylenehexamine, hexaethyleneheptamine, octylamine, nonylamine, decylamine, undecylamine, dodecylamine, tributylamine, triisooctylamine, tridecylamine, tridecylamine, tetradecylamine, pentadecylamine, hexadecylamine, heptadecylamine, octadecylamine, 4-hexylaniline, 4-heptylaniline, 4-octyl-aniline, 2,6-diisopropylaniline, 4-ethoxyaniline, N-methyl-aniline, N-ethylaniline, N-propylaniline, N-butyl aniline, N-pentylaniline, N-hexylaniline, N-octylaniline, N-cyclohexylaniline, dicyclohexylamine, p-toluidine, indoline, 2-phenylethylamine, 1-phenylethylamine, N-methyldecylamine, benzylamine, N,N-dimethylbenzylamine, 1-methylimidazole, 2-ethylhexylamine, dibutylamine, dihexylamine, di(2-ethyl-hexylamine), 3,3'-dimethyl-4,4'-diaminodicyclohexylmethane, 4,4'-diaminodicyclohexylmethane, ditridecylamine, isophoronediamine, N,N,N',N'-tetramethyl-1,6-hexanediamine, N,N-dimethylcyclohexylamine, octamethylenediamine, 2,6-xylidine, 4,7,10-trioxatridecane-1,13-diamine, 4,9-dioxadodecane-1,12-diamine, di(2-methoxyethyl)amine, bis(2-dimethylaminoethyl) ether, 2-(diisopropylamino)ethylamine, pentamethyldiethylenetriamine, N-(3-aminopropyl)imidazole, 1,2-dimethylimidazole, 2,2'-dimorpholinodiethyl ether, dimethylaminoethoxyethanol, bis(2-dimethylaminoethyl) ether, 1,8-diazabicyclo[5.4.0]undec-7-ene, 3-(2-aminoethylamino)propylamine, 3-(cyclohexylamino)propylamine, dipropylenetriamine, N,N'-bis(3-aminopropyl)ethylene-diamine, 1-(2-hydroxyethyl)piperazine, 1-vinylimidazole, 1-hexylimidazole, 1-octylimidazole and 1-(2-ethylhexyl)-imidazole.

6. A lithium ion battery of claim 2, wherein the electrolyte further comprises one or more nitriles, in an amount of from 1 to 15 parts by weight relative to 100 parts by weight aprotic solvent.

7. The lithium ion battery of claim 1, wherein the capacity of silicon of the anode material in the lithium ion battery is utilized to an extent of ≤50%, based on a maximum capacity of 4200 mAh per gram of silicon.

8. The lithium ion battery of claim 7, wherein the electrolyte comprises one or more monoamines and/or one or more polyamines, where the monoamines are of the formula (I)

$$NR^1R^2R^3 \quad (I)$$

in which
R¹, R², R³ are H or monovalent hydrocarbyl radicals which have 1 to 30 carbon atoms and may be substituted by one or more substituents selected from the group consisting of F—, Cl— and —OR⁴, and in which nonadjacent —CH₂— units are optionally replaced by units —C(=O)— and —O—, and
R⁴ is an alkyl radical having 1 to 10 carbon atoms; and polyamines are of the formula (II)

$$R^5{}_2N-(CR^6{}_2)_a-(NR^7-(CR^6{}_2)_b)_c-NR^5{}_2 \qquad (II)$$

in which
R⁵, R⁶, R⁷ are H or hydrocarbyl radicals which have 1 to 18 carbon atoms and are optionally substituted by one or more substituents selected from the group consisting of F—, Cl— and —OH, and in which nonadjacent —CH₂— units are optionally replaced by units —C(=O)— and —O—,
a, b are integers from 1 to 6, and
c has the value of 0 or is an integer from 1 to 40.

9. The lithium ion battery of claim 1, wherein the electrolyte comprises one or more monoamines and/or one or more polyamines, where the monoamines are of the formula (I)

$$NR^1R^2R^3 \qquad (I)$$

in which
R¹, R², R³ are H or monovalent hydrocarbyl radicals which have 1 to 30 carbon atoms and may be substituted by one or more substituents selected from the group consisting of F—, Cl— and —OR⁴, and in which nonadjacent —CH₂— units are optionally replaced by units —C(=O)— and —O—, and
R⁴ is an alkyl radical having 1 to 10 carbon atoms; and polyamines are of the formula (II)

$$R^5{}_2N-(CR^6{}_2)_a-(NR^7-(CR^6{}_2)_b)_c-NR^5{}_2 \qquad (II)$$

in which
R⁵, R⁶, R⁷ are H or hydrocarbyl radicals which have 1 to 18 carbon atoms and are optionally
substituted by one or more substituents selected from the group consisting of F—, Cl— and —OH, and in which nonadjacent —CH₂— units are optionally replaced by units —C(=O)— and —O—,
a, b are integers from 1 to 6, and
c has the value of 0 or is an integer from 1 to 40.

10. A lithium ion battery of claim 9, wherein the electrolyte comprises one or more amines selected from the group consisting of diethylenetriamine, triethylenetetramine, tetraethylenepentamine, pentaethylenehexamine, hexaethyleneheptamine, octylamine, nonylamine, decylamine, undecylamine, dodecylamine, tributylamine, triisooctylamine, tridecylamine, tridecylamine, tetradecylamine, pentadecylamine, hexadecylamine, heptadecylamine, octadecylamine, 4-hexylaniline, 4-heptylaniline, 4-octyl-aniline, 2,6-diisopropylaniline, 4-ethoxyaniline, N-methyl-aniline, N-ethylaniline, N-propylaniline, N-butyl aniline, N-pentylaniline, N-hexylaniline, N-octylaniline, N-cyclohexylaniline, dicyclohexylamine, p-toluidine, indoline, 2-phenylethylamine, 1-phenylethylamine, N-methyldecylamine, benzylamine, N,N-dimethylbenzylamine, 1-methylimidazole, 2-ethylhexylamine, dibutylamine, dihexylamine, di(2-ethylhexylamine), 3,3'-dimethyl-4,4'-diaminodicyclohexylmethane, 4,4'-diaminodicyclohexylmethane, ditridecylamine, isophoronediamine, N,N,N',N'-tetramethyl-1,6-hexanediamine, N,N-dimethylcyclohexylamine, octamethylenediamine, 2,6-xylidine, 4,7,10-trioxatridecane-1,13-di amine, 4,9-dioxadodecane-1,12-diamine, di(2-methoxyethyl)amine, bis(2-dimethylaminoethyl) ether, 2-(diisopropylamino)ethylamine, pentamethyldiethylenetriamine, N-(3-aminopropyl)imidazole, 1,2-dimethylimidazole, 2,2'-dimorpholinodiethyl ether, dimethylaminoethoxyethanol, bis(2-dimethylaminoethyl) ether, 1,8-diazabicyclo[5.4.0]undec-7-ene, 3-(2-aminoethylamino)propylamine, 3-(cyclohexylamino)propylamine, dipropylenetriamine, N,N'-bis(3-aminopropyl)ethylene-diamine, 1-(2-hydroxyethyl)piperazine, 1-vinylimidazole, 1-hexylimidazole, 1-octylimidazole and 1-(2-ethylhexyl)-imidazole.

11. A lithium ion battery of claim 9, wherein the electrolyte further comprises one or more nitriles.

12. A lithium ion battery of claim 1, wherein the electrolyte comprises one or more amines selected from the group consisting of diethylenetriamine, triethylenetetramine, tetraethylenepentamine, pentaethylenehexamine, hexaethyleneheptamine, octylamine, nonylamine, decylamine, undecylamine, dodecylamine, tributylamine, triisooctylamine, tridecylamine, tridecylamine, tetradecylamine, pentadecylamine, hexadecylamine, heptadecylamine, octadecylamine, 4-hexylaniline, 4-heptylaniline, 4-octyl-aniline, 2,6-diisopropylaniline, 4-ethoxyaniline, N-methyl-aniline, N-ethylaniline, N-propylaniline, N-butyl aniline, N-pentylaniline, N-hexylaniline, N-octylaniline, N-cyclohexylaniline, dicyclohexylamine, p-toluidine, indoline, 2-phenylethylamine, 1-phenylethylamine, N-methyldecylamine, benzylamine, N,N-dimethylbenzylamine, 1-methylimidazole, 2-ethylhexylamine, dibutylamine, dihexylamine, di(2-ethyl-hexylamine), 3,3'-dimethyl-4,4'-diaminodicyclohexylmethane, 4,4'-diaminodicyclohexylmethane, ditridecylamine, isophoronediamine, N,N,N',N'-tetramethyl-1,6-hexanediamine, N,N-dimethylcyclohexylamine, octamethylenediamine, 2,6-xylidine, 4,7,10-trioxatridecane-1,13-di amine, 4,9-dioxadodecane-1,12-diamine, di(2-methoxyethyl)amine, bis(2-dimethylaminoethyl) ether, 2-(diisopropylamino)ethylamine, pentamethyldiethylenetriamine, N-(3-aminopropyl)imidazole, 1,2-dimethylimidazole, 2,2'-dimorpholinodiethyl ether, dimethylaminoethoxyethanol, bis(2-dimethylaminoethyl) ether, 1,8-diazabicyclo[5.4.0]undec-7-ene, 3-(2-aminoethylamino)propylamine, 3-(cyclohexylamino)propylamine, dipropylenetriamine, N,N'-bis(3-aminopropyl)ethylene-diamine, 1-(2-hydroxyethyl)piperazine, 1-vinylimidazole, 1-hexylimidazole, 1-octylimidazole and 1-(2-ethylhexyl)-imidazole.

13. A lithium ion battery of claim 12, wherein the electrolyte further comprises one or more nitriles.

14. A lithium ion battery of claim 13, wherein one or more nitriles contain 2 to 20 carbon atoms.

15. A lithium ion battery of claim 1, wherein the electrolyte further comprises one or more nitriles.

16. A lithium ion battery of claim 15, wherein one or more nitriles are nitriles of acetic acid, propionic acid, butyric acid, valeric acid or caproic acid or of a fatty acid having up to 18 carbon atoms, or are dinitriles of malonic acid, succinic acid, glutaric acid, adipic acid, pimelic acid or suberic acid.

17. The lithium ion battery of claim 15, wherein one or more nitriles are silylated nitriles.

18. The lithium ion battery of claim 15, wherein one or more nitriles are selected from the group consisting of 3-(fluorodimethylsilyl)butanenitrile (FSN), 3-(fluorodimethyl silyl)propanenitrile, 3-(fluorodimethyl-silyl)pentanenitrile, 3-(fluoromethylsilyl)butanenitrile and 3-(difluoromethylsilyl)butanenitrile.

19. The lithium ion battery of claim 1, wherein the silicon particles of the anode have a volume-weighted particle size distribution with diameter percentiles $d_{10} \geq 0.2$ μm and $d_{90} \leq 20.0$ μm.

20. The lithium ion battery of claim 1, wherein the silicon particles of the anode have a volume-weighted particle size distribution having a breadth $d_{90}-d_{10}$ of $\leq 15.0$ μm and $\geq 0.6$ μm.

21. The lithium ion battery of claim 1, wherein the silicon particles of the anode have a volume-weighted particle size distribution having diameter percentiles $d_{50}$ of 2.0 to 7.0 μm.

22. The lithium ion battery of claim 1, wherein the silicon particles of the anode are not aggregated.

23. The lithium ion battery of claim 1, wherein the silicon particles of the anode have a volume-weighted particle size distribution having diameter percentiles $d_{50}$ of 0.7 to 3.0 μm.

* * * * *

UNITED STATES PATENT AND TRADEMARK OFFICE
CERTIFICATE OF CORRECTION

PATENT NO. : 10,727,529 B2
APPLICATION NO. : 15/761291
DATED : July 28, 2020
INVENTOR(S) : Stefan Haufe et al.

It is certified that error appears in the above-identified patent and that said Letters Patent is hereby corrected as shown below:

In the Claims

Column 18, Line 29, Claim 5:
After "N-propylaniline,"
Delete "N-butyl aniline" and
Insert -- N-butylaniline --

Column 19, Line 57, Claim 10:
After "N-propylaniline,"
Delete "N-butyl aniline" and
Insert -- N-butylaniline --

Column 19, Line 67, Claim 10:
After "2,6-xylidine,"
Delete "4,7,10-trioxatridecane-1,13-di amine" and
Insert -- 4,7,10-trioxatridecane-1,13-diamine --

Column 20, Line 25, Claim 12:
After "N-propylaniline,"
Delete "N-butyl aniline" and
Insert -- N-butylaniline --

Signed and Sealed this
Fifteenth Day of December, 2020

Andrei Iancu
*Director of the United States Patent and Trademark Office*